US008919973B2

(12) United States Patent
Schmierer et al.

(10) Patent No.: US 8,919,973 B2
(45) Date of Patent: Dec. 30, 2014

(54) MIRROR BASE COVER

(75) Inventors: Arne Schmierer, Kirchheim (DE);
Raimund Negel, Unterensingen (DE);
Andreas Herrmann, Winnenden-Baach
(DE); Istvan Szmolenszki, Schwaikheim
(DE)

(73) Assignee: SMR Patents S.a.r.l., Luxembourg (LU)

( * ) Notice: Subject to any disclaimer, the term of this patent is extended or adjusted under 35 U.S.C. 154(b) by 213 days.

(21) Appl. No.: 13/163,953

(22) Filed: Jun. 20, 2011

(65) Prior Publication Data

US 2011/0317295 A1 Dec. 29, 2011

(30) Foreign Application Priority Data

Jun. 28, 2010 (EP) .................................. 10167557

(51) Int. Cl.
*B60R 1/06* (2006.01)
*G02B 7/182* (2006.01)

(52) U.S. Cl.
CPC .. *B60R 1/06* (2013.01); *G02B 7/182* (2013.01)
USPC ......... 359/841; 359/871; 248/475.1; 248/479

(58) Field of Classification Search
CPC .................................. B60R 1/06; G02B 7/182
USPC ....................... 248/475.1, 476, 479, 485, 487
See application file for complete search history.

(56) References Cited

U.S. PATENT DOCUMENTS

| | | | | | |
|---|---|---|---|---|---|
| 4,197,762 A | * | 4/1980 | Yamana | ........................ | 74/502.1 |
| 4,253,633 A | * | 3/1981 | Takegawa | .................. | 248/475.1 |
| 5,245,480 A | * | 9/1993 | Polzer | ........................... | 359/841 |
| 5,332,186 A | * | 7/1994 | Lutz | ............................... | 248/549 |
| 5,966,254 A | * | 10/1999 | Flowers et al. | ............... | 359/841 |

(Continued)

FOREIGN PATENT DOCUMENTS

| | | |
|---|---|---|
| BE | 703478 | 2/1968 |
| DE | 4323534 | 1/1995 |
| DE | 10338797 | 3/2005 |
| WO | 0194091 | 12/2001 |

OTHER PUBLICATIONS

European Search Report for application No. EP 10 16 7557 dated Oct. 27, 2010.

*Primary Examiner* — Ricky D Shafer
(74) *Attorney, Agent, or Firm* — Reising Ethington P.C.

(57) ABSTRACT

A mirror base cover for an exterior rear view mirror assembly of a motor vehicle is described, which is provided with an opening for a part on the mirror base side of an articulated connection of a base bracket, which is preferably housed in an exterior rear view mirror housing, to a mirror base, which is covered by the mirror base cover. The opening has a larger design than is necessary for the part on the mirror base side of the articulated connection. A section of the opening remaining between the edge of the opening and the part on the mirror base side of the articulated connection is closed by a mirror base cap assembly. The mirror base cap assembly consists of a mirror base cap, only partly covering the remaining section of the opening, and a seal, moulded onto the mirror base cap, overlapping a gap remaining between the mirror base cap and the edge of the opening. The mirror base cap extends at least partly to the edge of the opening, so that contact between the mirror base cap and the edge of the opening is made, at least in places.

10 Claims, 7 Drawing Sheets

(56) References Cited

U.S. PATENT DOCUMENTS

| | | | |
|---|---|---|---|
| 6,217,181 B1* | 4/2001 | Lynam et al. | 359/879 |
| 6,609,800 B2* | 8/2003 | Assinder et al. | 359/841 |
| 6,994,443 B2* | 2/2006 | Schuurmans et al. | 359/872 |
| 7,073,914 B2* | 7/2006 | Pavao | 359/841 |
| 7,104,662 B2* | 9/2006 | Kawanishi | 359/871 |
| 7,137,715 B2* | 11/2006 | Schuurmans et al. | 359/841 |
| 7,836,553 B2* | 11/2010 | Brouwer et al. | 16/354 |
| 8,113,672 B2* | 2/2012 | Itoh et al. | 359/876 |
| 8,201,305 B2* | 6/2012 | Brouwer et al. | 16/354 |
| 2005/0128610 A1* | 6/2005 | Parker et al. | 359/871 |
| 2005/0248168 A1* | 11/2005 | Boddy et al. | 296/1.11 |
| 2007/0242373 A1* | 10/2007 | Yamauchi | 359/841 |
| 2008/0062545 A1* | 3/2008 | Su | 359/879 |
| 2008/0080076 A1* | 4/2008 | Hutzel et al. | 359/871 |
| 2008/0316627 A1* | 12/2008 | Shinohara | 359/871 |
| 2009/0147388 A1 | 6/2009 | Mendoza | |
| 2011/0299182 A1* | 12/2011 | Schmierer et al. | 359/843 |
| 2011/0317297 A1* | 12/2011 | Herrmann et al. | 359/871 |
| 2011/0317445 A1* | 12/2011 | Schmierer et al. | 362/540 |

* cited by examiner

MIRROR BASE COVER

The invention is based on a priority patent application EP 10167557.7 which is hereby incorporated by reference.

BACKGROUND ART

1. Field of the Invention

The invention relates to a mirror base cover for an exterior rear view mirror assembly of a motor vehicle with an opening for a part on the mirror base side of an articulated connection of a base bracket, which is preferably arranged in an exterior rear view mirror housing with a mirror base, covered by means of a mirror base cover, whereby the opening is larger than is necessary for the part on the mirror base side of the articulated connection, and a section of the opening remaining between the edge of the opening and the part on the mirror base side of an articulated connection is closed by a mirror base cap assembly, which consists of a mirror base cap partly covering the remaining section of the opening, and a seal moulded thereon, which overlaps a remaining gap between the mirror base cap and the edge of the opening, wherein the mirror base cap extending at least partly to the edge of the opening, so that contact between the mirror base cap and the edge of the opening is made, at least in places.

2. Description of the Related Art

An exterior rear view mirror assembly for a motor vehicle consists, for example, of a mirror base arranged on the motor vehicle, which can be covered by a mirror base cover, and an exterior rear view mirror arranged on the mirror base. The mirror base can be produced from die-casting material, for example, which is resistant to the forces and moments which occur. The exterior rear view mirror includes an exterior rear view mirror housing, which, among others, houses the base bracket assigned to the mirror base.

The mirror base and the base bracket are hinged together, so that the exterior rear view mirror can be pivoted about a hinge axis in relation to the mirror base from an operating position to a folding point and vice versa. In this process, bearing means can be provided between the mirror base and the base bracket, in order to keep wear and tear and frictional forces, which arise during the pivoting movement, as low as possible.

Preferably, the base bracket is also produced from die-casting material, which is resistant to the occurring forces and moments, for example, from the same material as the mirror base. An adjusting device for a mirror glass, driven by an electric motor, for example, is arranged on the base bracket. The adjusting device acts on a backing plate, on which the mirror glass is arranged. The mirror glass can be mounted onto the backing plate by means of an adhesive connection, for example. The backing plate can be guided to and/or mounted on the adjustment device and/or the base plate.

On its rear side, facing away from the direction of movement of the motor vehicle in the operating position, the exterior rear view mirror housing comprises an opening, through which the mirror glass is visible, or in which the mirror glass is arranged. In order to ensure that the mirror glass is adjustable, a distance is kept on all sides between the mirror glass or backing plate and the walls of the exterior rear view mirror housing surrounding the opening, so that a gap is given around the mirror glass between the walls of the exterior rear view mirror housing surrounding the opening.

Additionally, the exterior rear view mirror can comprise a turn signal indicator, a module for a driving assistance device, such as blind spot monitoring, a lane departure warning, approach monitoring, or similar, or a combination thereof. Alternatively or additionally, the exterior rear view mirror can also comprise sensors for detecting driving and/or surrounding conditions, such as for example, temperature, brightness, degree of pollution, lighting situation, for example, in order to automatically heat the mirror glass, or to dim electro-chromatically, for example.

A known object in the development and production of motor vehicle parts is a simple, time-saving assembly. For example, for covering the mirror base, it can be intended that the mirror base cover comprises an opening precisely assigned to the articulated connection between the mirror base and the base bracket. On one hand, the accuracy of fit is necessary in order to achieve the exact positioning of the mirror base and exterior rear view mirror with the mirror foot cover, and on the other hand, to maintain small gap dimensions, in order to prevent the entry of spray water, for example.

Since the mirror base cover presents a relatively large component, which is usually produced in an injection moulding process, dimensional deviations and tolerances can result in the opening and the articulated connection not corresponding at least in such a way straightaway, whereby the assembly is made more difficult. This leads to unnecessarily high assembly effort, possibly connected with undesired rejections.

In precise production of the mirror base cover, the connection between the mirror base and the mirror base cover to be made in assembly is also difficult. Among others, the difficulty is due to the connection of the mirror base and mirror base cover, for example, by a screw connection, taking place before the mirror base is slotted into or pushed into the mirror base cover. In the process, the opening provided in the mirror base cover for the articulated connection between the mirror base and the base bracket, housed in the exterior rear view mirror, must align with the part on the mirror base side of the articulated connection, at least in the intended stop position of the slotting connection. If the part on the mirror base side concerns, for example, a shaft arranged rigidly on the mirror base, with an extension along the hinge axis, the assembly alone is difficult due to the relatively large dimensions of this shaft in comparison to the inside dimensions of the space surrounded by the mirror base cover. In addition, the complex geometry of the mirror base and the mirror base cover makes it impossible for the direction of movement of the mirror base and mirror base cover whilst being slotted together to conform with the longitudinal axis of the shaft and the central axis of the opening. Therefore, so that they can be slotted together, a complicated rotational movement must be carried out at the same time, in order to be able to pass the pins through the opening provided during assembly. Amongst others, this rotational movement, in connection with slotting together, represents a considerable time factor in assembly of an exterior rear view mirror assembly.

In order to rectify this problem, it is known that the opening has a larger design than is necessary for the part of the articulated connection on the mirror base side. A part of the opening remaining between the edge of the opening and the part of the articulated connection on the mirror base side is covered by a mirror base cap assembly. The mirror base cap assembly consists of a mirror base cap made of a rigid, hard component. Between the edge of the opening and the mirror base cap or the external contour of mirror base cap, a seal made of an elastic, soft component is provided, which prevents the entry of spray water and/or dirt, for example, in the space surrounded by the mirror base cover. The seal is moulded around the mirror base cap. The mirror base cap assembly can be produced in addition e.g. in a two-part of multi-part component injection moulding process. When installing the mirror base cap assembly, the seal is formed elastically at the same time as sealing the gap between the mirror base cap and the edge of the opening.

A disadvantage of this is that the seal is deformed whilst maintaining its volume, whereby there can be contact between the seal and the exterior rear view mirror, or the part of the articulated connection on the exterior rear view mirror side between the mirror base and the base bracket. In a pivoting movement of the exterior rear view mirror in relation to the mirror base from an operating position to a folding point and vice versa, about the hinge axis of the articulated connection between the mirror base and base bracket, there is therefore a synchronisation of the mirror base cover assembly. Therefore, undesired signs of wear, the entry of liquid and/or dirt, as well as a disadvantageous impression of quality, can occur.

SUMMARY OF THE INVENTION

An object of the invention is to develop an improved mirror base cover, which permits a covering of a mirror base with low assembly effort, and comprises a high quality impression with simultaneous low wear and reliable sealing against liquid and dirt.

The object is achieved by an opening for a part on the mirror base side of an articulated connection of a base bracket, which is preferably arranged in an exterior rear view mirror housing with a mirror base, covered by means of a mirror base cover, whereby the opening is larger than is necessary for the part on the mirror base side of the articulated connection, and a section of the opening remaining between the edge of the opening and the part on the mirror base side of an articulated connection is closed by a mirror base cap assembly, which consists of a mirror base cap partly covering the remaining section of the opening, and a seal moulded thereon, which overlaps a remaining gap between the mirror base cap and the edge of the opening, wherein the mirror base cap extending at least partly to the edge of the opening, so that contact between the mirror base cap and the edge of the opening is made, at least in places.

Accordingly, a mirror base cover for an exterior rear view mirror assembly of a motor vehicle is provided, which is intended for covering a mirror base which can be mounted or is mounted on the motor vehicle. The mirror base cover is provided with an opening for a part on the mirror base side of an articulated connection of a base bracket, which is preferably housed in an exterior rear view mirror housing, to the mirror base. The opening has a larger design than is necessary for the part on the mirror base side of the articulated connection. Therefore, the assembly of the mirror base cover is made considerably easier, since the custom-fit cover of the part of the opening remaining between the opening and the part on the mirror base side of the articulated connection, takes place only after the mirror base and mirror base cover and slotted into one another by installation of the mirror base cover. Therefore, the movement necessary for joining the mirror base and the mirror base cover together is made easier, which leads to a considerable saving of time and costs in assembly. A part of the opening remaining between the edge of the opening and the part on the mirror base side of the articulated connection is closed by a mirror base cap assembly. The mirror base cap assembly preferably covers the opening, including a section of the mirror base bearing or surrounding the part on the mirror base side of the articulated connection, up to the part on the mirror base side of the articulated connection. The mirror base cap assembly consists of a mirror base cap, which only partly covers the remaining section of the opening, and a seal, moulded onto this, overlapping or covering a gap remaining between the mirror base cap and the edge of the opening. The mirror base cap is produced from a first, hard and rigid component, for example, whereas the seal consists of a second, preferably soft, elastic component, for example, an elastomer. Both components can be thermoplastic plastic. The mirror base cap itself can comprise a preferably custom-fit recess for the part on the mirror base side of the articulated connection. The recess can be designed in the form a central opening, so that the mirror base cap extends around the central opening on all sides. The mirror base cap extends at least partly to the edge of the opening, so that it makes contact with the edge of the opening, at least in places. Extensions can also be provided on the periphery of the mirror base cover, which, in the case of the mirror base cap assembly installed in the opening, lie in the surface spanned by the edge of the opening, and reach to the edge of the opening, so that contact is made between the mirror base cap and the edge of the opening. Through this measure, at least individual sections of the mirror base cover, which include contact points with the edge of the opening, extend at least from the edge of the opening up to the part of the hinged connection on the mirror base side reaching through the central opening. The seal is preferably moulded to the mirror base cap in a two-component or multi-component injection moulding procedure, and closes at least a gap remaining between the edge of the opening and the mirror base cap. The seal can also overlap the edge of the opening. Alternatively or additionally, the seal can overlap and/or extend outside of the mirror base cap, and reach the part on the mirror base side of the articulated connection, or can border the part on the mirror base side of the articulated connection. The seal can be moulded around the mirror base cap.

Among others, advantages of the invention in relation to the prior art arise from the fact that the mirror base cap assembly can now support itself directly on the edge of the opening, by means of the hard, rigid components of the mirror base cap. The contact produced in places is sufficient in order to support the mirror base cap in a turning moment acting on it or the mirror base cap assembly in relation to the edge of the opening, so that this stays in its intended position and location. Due to this support, turning or synchronisation of the mirror base cap assembly during a pivoting movement of the exterior rear view mirror in relation to the mirror base from an operating position to a folding point and vice versa, about the hinge axis of the articulated connection between the mirror base and base bracket, is effectively prevented. Therefore, a consistently higher impression of quality is given, with simultaneous low wear and reliable sealing against liquid and dirt.

The mirror base cap, seen from an imagined central point of the mirror base cap, preferably has connecting links, protruding outwards in a radial manner, corresponding to the edge of the opening in at least one place, which engage behind the edge of the opening, seen from a top view of a surface spanned by the edge of the opening. The central point is characterised in that it lies essentially centrally in the mirror base cap or in the surface formed by the contour of the mirror base cap. By means of the connecting link, the mirror base cap can be attached to the edge of the opening in a custom-fit manner, and subsequently can be folded into the surface formed by the opening, by a folding motion about a hinge joint, which is simply formed by the spreading of the connecting links. Preferably, the connecting link lies inside of a contact point with the section of the mirror base cap containing the edge of the opening, so that the connecting link lies opposite an extension, as a hard, rigid component, which is arranged on the periphery of the mirror base cap.

In addition, the mirror base cap can have at least one flexurally elastic and/or spring elastic malleable latch, which engages behind the wall of the opening, seen from a top view of the surface spanned by the edge of the opening. Preferably, at least one latch is arranged in a region of the mirror base cap lying opposite to the at least one connecting link, which protrudes outwards in a radial manner. The latch and edge of the opening thus form a locking connection or clip connection, which, in conjunction with the at least one connecting link protruding outwards in a radial manner, and engaging behind the edge of the opening on a opposite-facing side of the mirror base cap, is suitable for fixing the mirror base cap under cover of the region of the opening remaining between the edge of the opening and the part on the mirror base side of the articulated connection. Alternatively, it is possible to provide a locking connection on the mirror base cover underneath the edge of the opening, and to provide on the mirror base cap a locking feature protruding into the opening, perpendicular to the surface spanned by the contour of the mirror base cover, for example, which locking feature is assigned to the latch. Regarding this design, it is apparent that a latch arranged on the mirror base cap, engaging behind the edge of the opening, has the advantage that it is easier and more cost-effective to produce, since in a specific configuration of a locking means, such as a locking feature, co-operating with the latch, can be abandoned, and instead the edge of the opening is used as a corresponding locking means. The latch can be arranged inside of a contact point with the section of the mirror base cap containing the edge of the opening, so that the latch lies opposite an extension, as a hard, rigid component, which is arranged on the periphery of the mirror base cap, with which the mirror base cap is supported on the edge of the opening. Through this, a reliable locking effect of the locking connection or clip connection is ensured, since in comparison with the prior art, where an inexact position of the mirror base cap is acquiescently accepted, due to the seal being found on all sides between the mirror base cap and the edge of the opening, a precise orientation of the mirror base cap is ensured inside of the opening.

On the mirror base cover, in the region of the opening, a receiving pocket for a protrusion, arranged on the section of the mirror base bearing the part on the mirror base side of the articulated connection, can be provided. The form of the receiving pocket and the form of the protrusion can correspond to each other in such a way that the protrusion can penetrate the receiving pocket up to a predetermined depth. Preferably, a self-centering takes place when the protrusion and receiving pocket are slotted together.

At least one elastically deformable latch can be arranged in a region of the mirror base cap lying opposite the receiving pocket, when the mirror base cap covers the region of the opening remaining between the edge of the opening and the part of the articulated connection on the mirror base side. The latch can at least partly engage behind the receiving pocket, and thus contributes to the locking of the mirror base cap and the mirror base cover.

A surrounding seal can also be provided, for example, towards the part on the mirror base side of the articulated connection. If the recess for the part on the mirror base side of the articulated connection on the edge of the opening provided in the mirror base cover, in this way a seal can serve for sealing between the mirror base cap and the edge, as well as between the mirror base cap and the part on the mirror base side of the articulated connection.

The moulded seal can be designed in such a way that it protects the articulated connection against dust and spray water. In addition, the seal can protrude over the surface spanned by the edge of the opening provided in the mirror base cover in the direction of the exterior rear view mirror housing, which houses the base bracket.

The seal preferably consists of a thermoplastic elastomer.

Reinforcements corresponding to the latches and/or connecting links and/or locking springs and/or locking features and/or receiving pockets or similar can be provided around the opening.

In principle, it is also possible that the latches or locking springs and assigned rearward engagements on the mirror base cap and on the edge of the opening can also be designed interchangeably, so that as opposed to the above designs, a latch is arranged on the mirror base cover in the region of the end of the opening, and a corresponding rearward engagement e.g. a connecting link is arranged with a locking feature on the mirror base cap. A composite arrangement is also possible, whereby at least one latch is provided on the mirror base cap and at least one latch is provided on the mirror base cover. Locking means corresponding to the latches are also arranged on the respective other component.

Further features of the invention result from the claims, description and drawings.

BRIEF DESCRIPTION OF THE DRAWINGS

Advantages of the invention will be readily appreciated as the same becomes better understood by reference to the following detailed description when considered in connection with the accompanying drawings, wherein.

Embodiments of the invention are subsequently explained in more detail by means of the drawings. Identical reference characters denote identical or identically acting elements. In the drawings, shown schematically.

DETAILED DESCRIPTION OF THE PREFERRED EMBODIMENT

Figure 1:
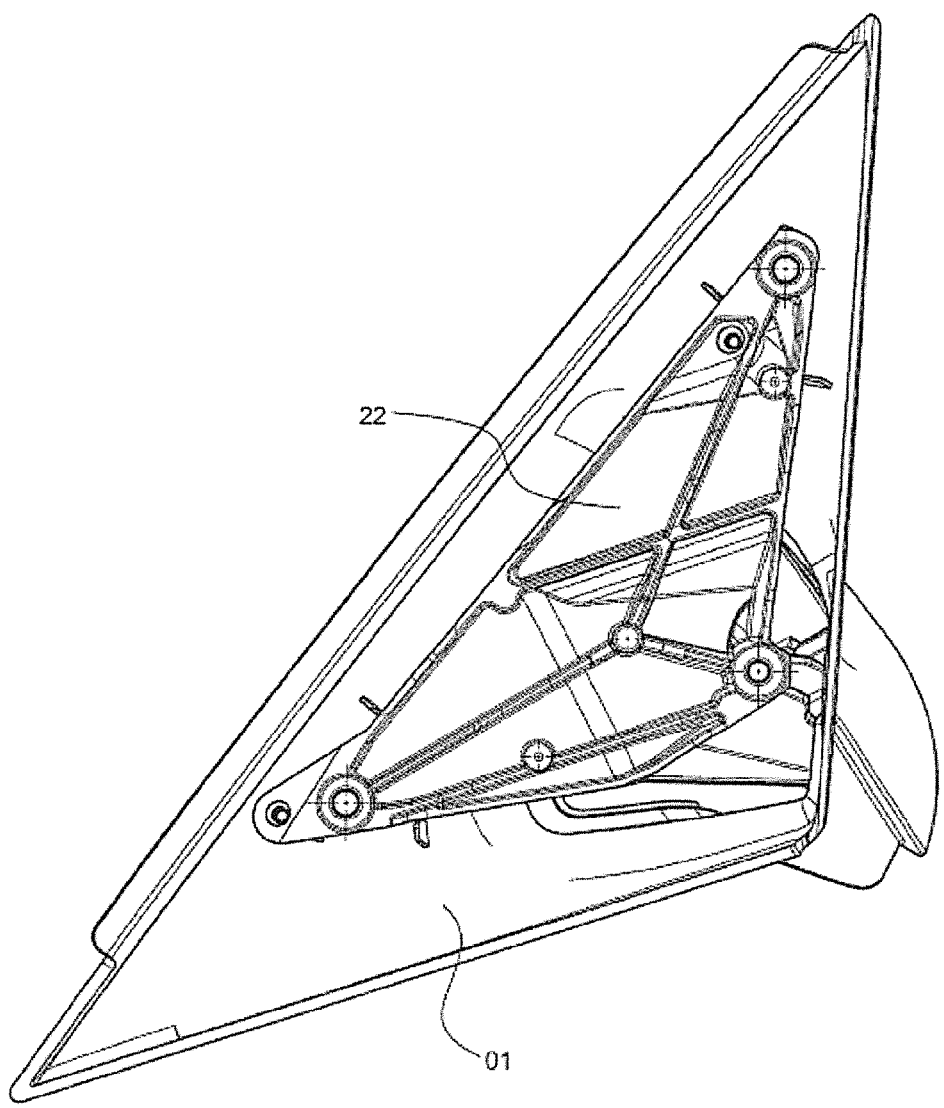
FIG. 1 shows a mirror base cover covering a mirror base, for an exterior rear view mirror assembly of a motor vehicle, seen from a side for assembly on the motor vehicle side.

A mirror base cover 01, shown as a whole or in parts in FIGS. 1 to 9, for an exterior rear view mirror assembly of a motor vehicle, is provided for covering a mirror base 02 which is mounted or can be mounted onto the motor vehicle. The mirror base cover 01 has an opening 03 for a part 04 on the mirror base side of an articulated connection of a base bracket 22 housed in an exterior rear view mirror housing, for example, with the mirror base 02. The part 04 on the mirror base side of the articulated connection comprises, for example, a bearing 05 and a shaft 06 fixedly arranged on the mirror base, with an extension along the hinge axis 07 of the articulated connection. In addition, a pin 08 can also be assigned to the part 04 on the mirror base side of the articulated connection, which pin can be provided as an end stop for a pivoting movement of the exterior rear view mirror from an operating position to a folding point and vice versa, about the hinge axis 07.

The opening 03 has a larger design than is necessary for the part 04 on the mirror base side of the articulated connection. A section of the opening 03 remaining between the circumferentially closed edge 09 of the opening 03 and the part 04 on the mirror base side of the articulated connection is closed by a mirror base cap assembly 19 consisting of a mirror base cap 10 and a seal 15, which is molded around the mirror base cap 10, overlapping a remaining gap 20 or remaining gap sections 20 (FIG. 5) between the circumferentially closed edge 09 of the opening 03 and the mirror base cap 10. The mirror base cap 10 itself extends at least partly to the circumferentially closed edge 09 of the opening 03, and makes contact with this, at least in places. On the periphery of the mirror base cap 10, extensions 21 can also be provided, which in the case of the mirror base cap assembly 19 installed in the opening 03, lie in the surface spanned by the edge 09 of the opening 03, and reach to the circumferentially closed edge 09 of the opening 03, so that contact is made between the mirror base cap 10 and the circumferentially closed edge 09 of the opening 03.

Figure 2:
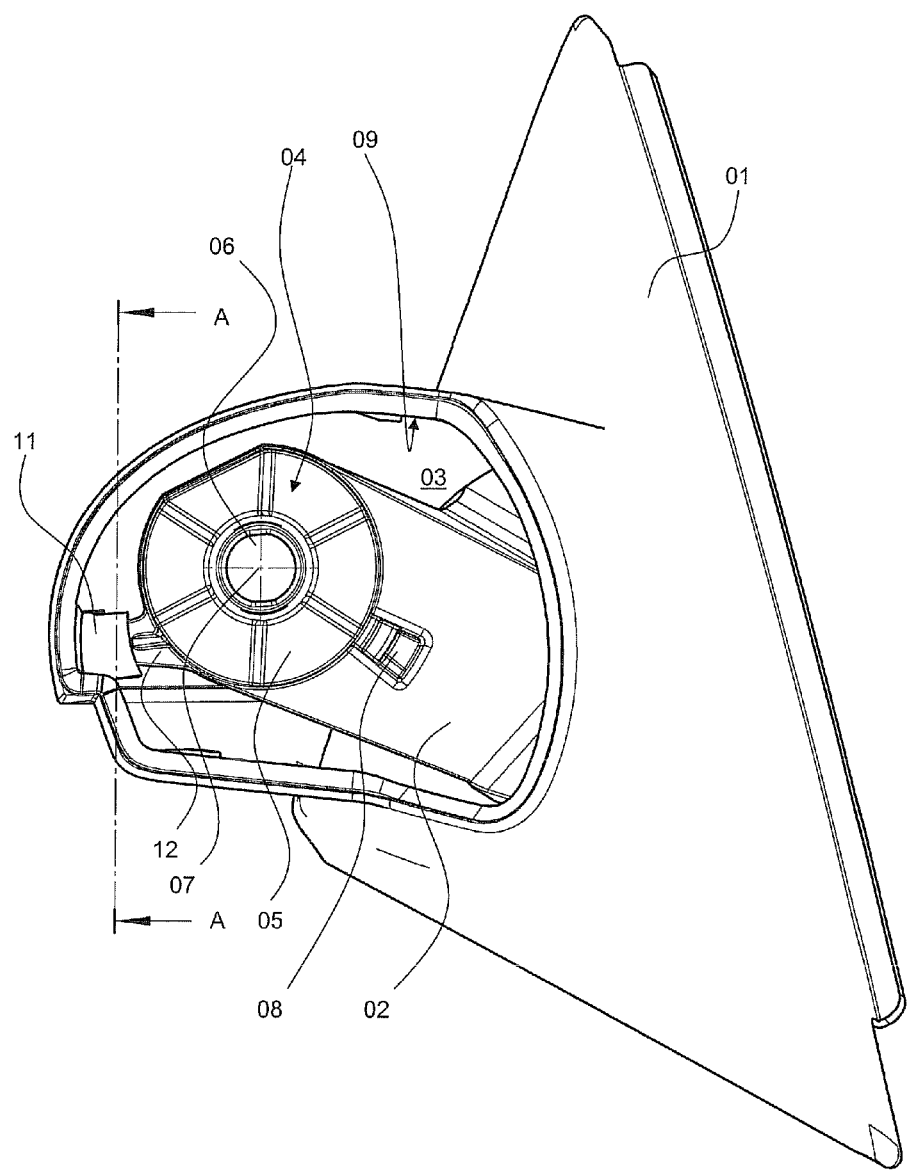
FIG. 2 shows the mirror base cover from FIG. 1 in a top view in the direction of the hinge axis of an articulated connection between a base bracket and the mirror base covered by the mirror base cover.
Figure 3:
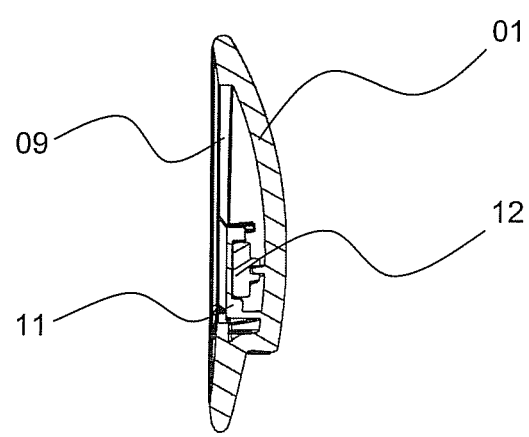
FIG. 3 shows a section through the mirror base cover and the mirror base from FIG. 2 along the sectional plane there shown by A-A.
Figure 4:
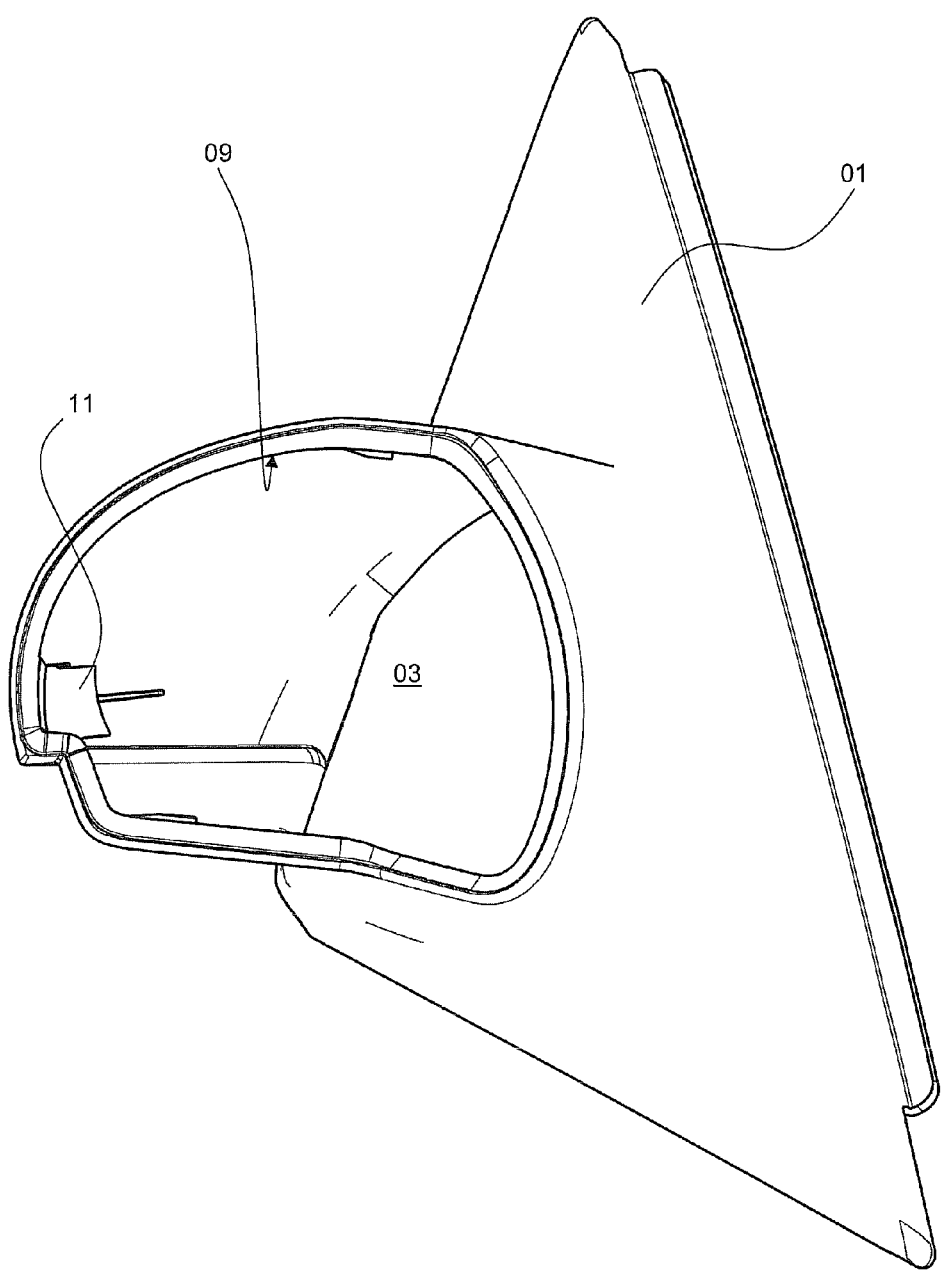
FIG. 4 the same top view of the mirror base cover as in FIG. 2. without the mirror base.
Figure 5:
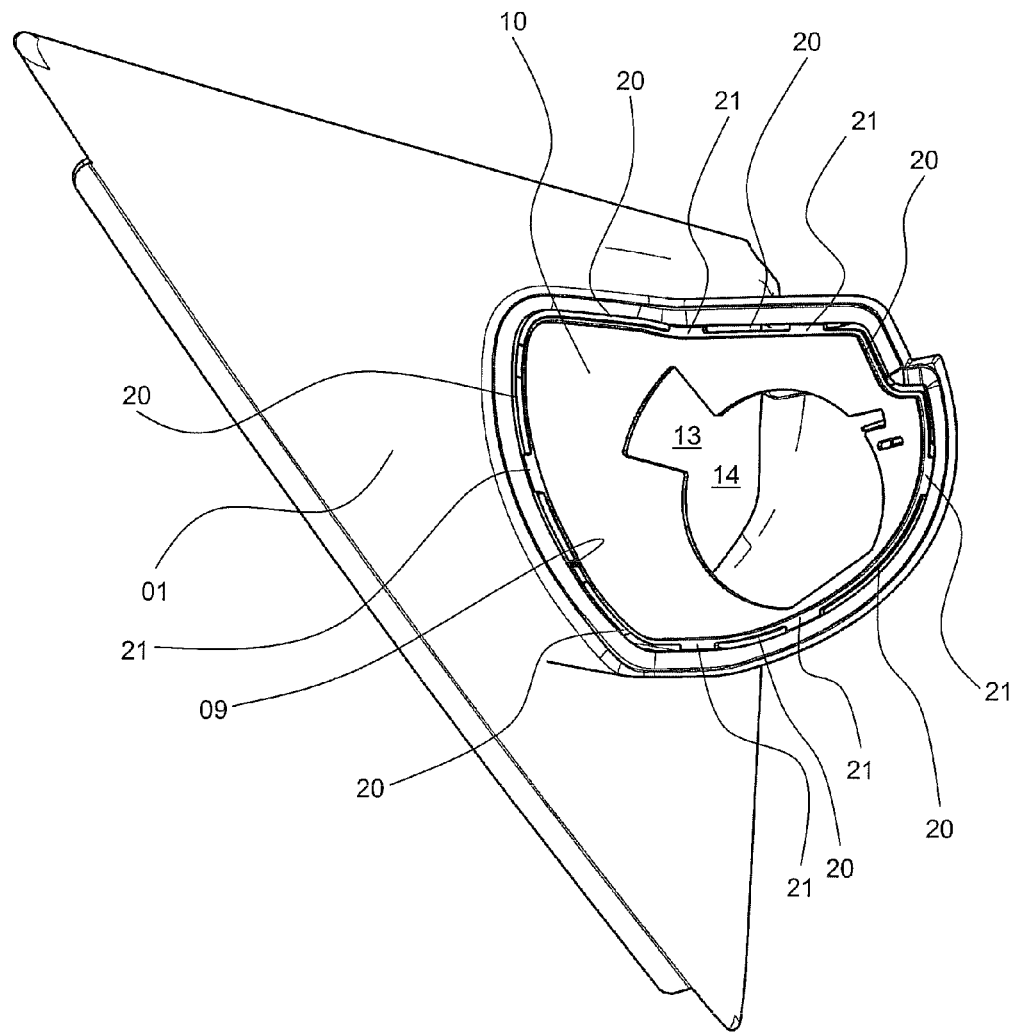
FIG. 5 shows a mirror base cover with assembled mirror base cap from a top view.
Figure 6:
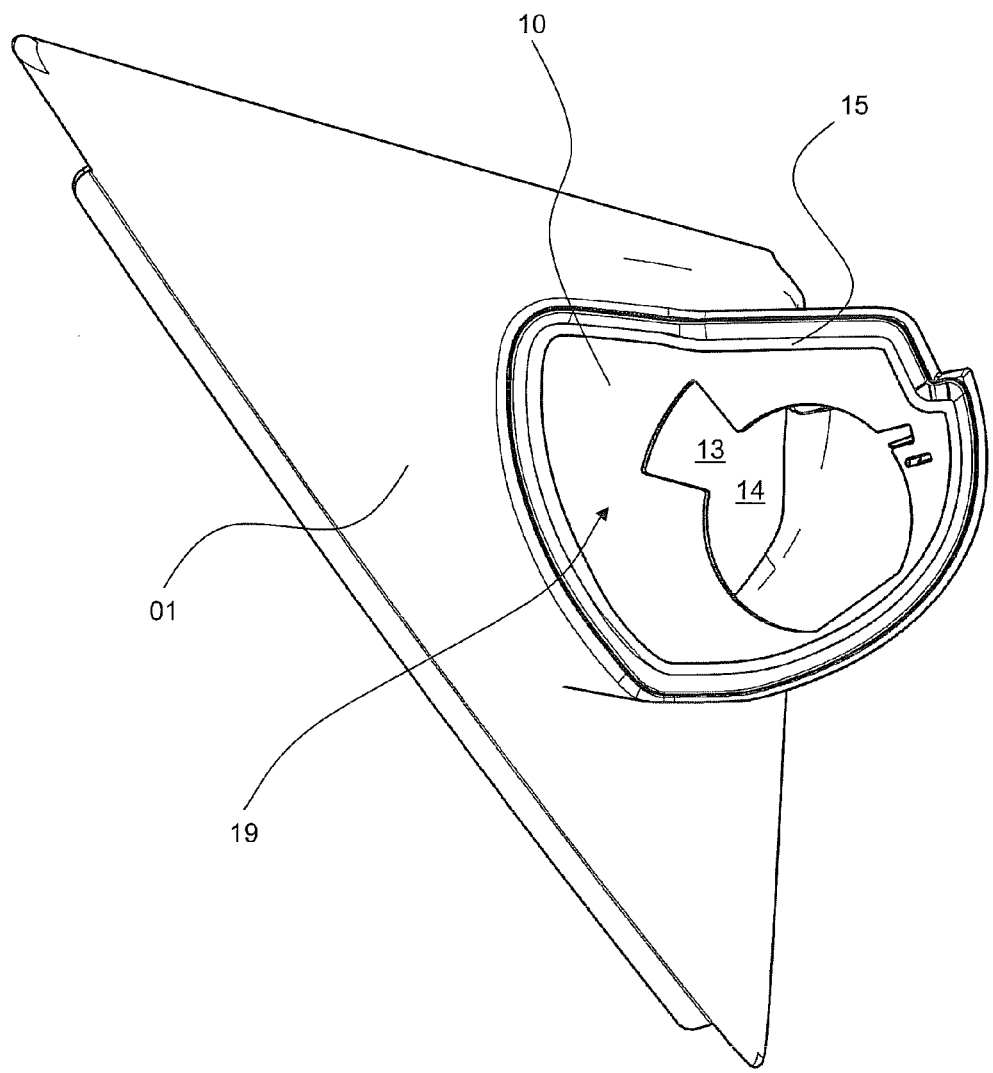
FIG. 6 shows a mirror base cover with assembled mirror base cap and surrounding seal from a top view.

A receiving pocket 11 for a protrusion 12 can be arranged on the mirror base cover 01, in the region of the opening 03, with the protrusion 12 being arranged on a section of the mirror base 02 bearing the part 04 on the mirror base side of the articulated connection (FIGS. 2, 3, 4). In the process, the receiving pocket 11 and the protrusion 12 are preferably arranged in such a way that the protrusion 12 can only enter the receiving pocket 11 to a predetermined depth. In addition, the receiving pocket 11 and the protrusion can comprise a geometry, which facilitates a self-centering of the protrusion 12 during insertion into the receiving pocket 11. For example, the protrusion 12 can taper conically towards its end for this purpose. The receiving pocket can also taper with increasing penetration depth of the protrusion 12.

The mirror base cap 10 preferably comprises a recess 13 assigned to the part 04 on the mirror base side of the articulated connection. The recess 13 can be designed in a custom-fit manner for the part 04 on the mirror base side of the articulated connection. The recess 13 can be designed in the form a central opening 14, so that the mirror base cap 10 extends on all sides between the circumferentially closed edge 09 of the opening 03 and the part 04 on the mirror base side of the articulated connection.

The mirror base cap assembly 19 is at least attached to the circumferentially closed edge 09 of the opening 03, or overlaps this preferably with the seal 15, consisting of a thermoplastic elastomer, for example. The mirror base cap 10 of the mirror base cap assembly 19 preferably extends to the part 04 on the mirror base side of the articulated connection.

The seal 15 preferably overlaps the circumferentially closed edge 09, in order to ensure perfect sealing, and a reliable protection against the entry of spray water and dirt in the space surrounded by the mirror base cover 01 and housing the mirror base 02. The seal 15 can be molded to the mirror base cap 10 in a two-part or multi-part injection molding process. In addition, a seal can be provided between the part 04 on the mirror base side of the articulated connection and the mirror base cap 10.

The seal 15 can also can be designed in such a way that it simultaneously protects the articulated connection against dust and spray water. In addition, the seal 15 can protrude in the direction of the hinge axis 07 over the surface spanned by the circumferentially closed edge 09 of the opening 03 provided in the mirror base cover 01. This corresponds to a direction to the exterior rear view mirror housing which houses the base bracket 22 mentioned at the outset.

The mirror base cap 10 can comprise, for example, two connecting links 16 protruding radially outwards from an imagined central point of the mirror base cap 10. When the mirror base cap 10 is covering the portion of the opening 03 remaining between the circumferentially closed edge 09 of the opening 03 and the part 04 of the articulated connection on the mirror base side, the connecting links 16 engage behind the circumferentially closed edge 09 of the opening 03, viewed from above looking onto a surface spanned by the circumferentially closed edge 09 of the opening 03. The imagined central point lies on the hinge axis 07, for example.

Figure 7:
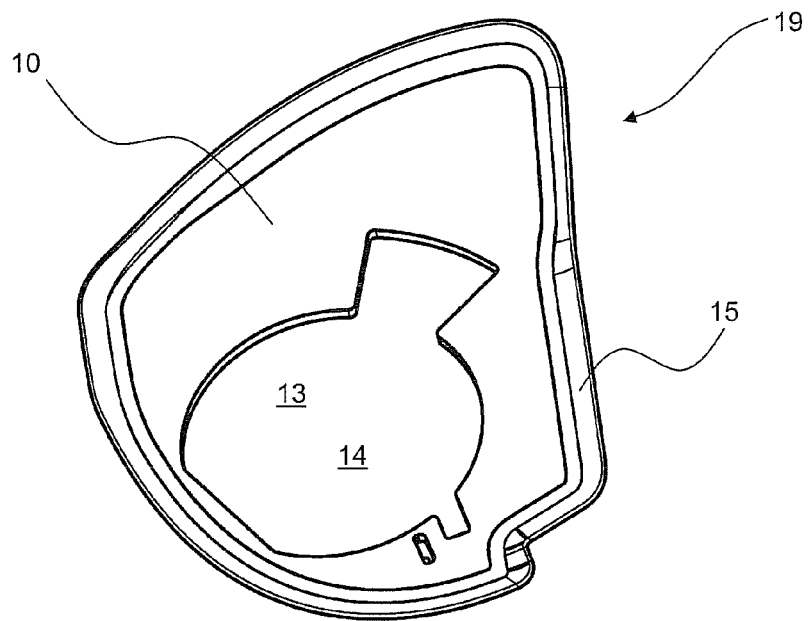
FIG. 7 shows a mirror base cap with a surrounding moulded seal from a perspective view.
Figure 8:
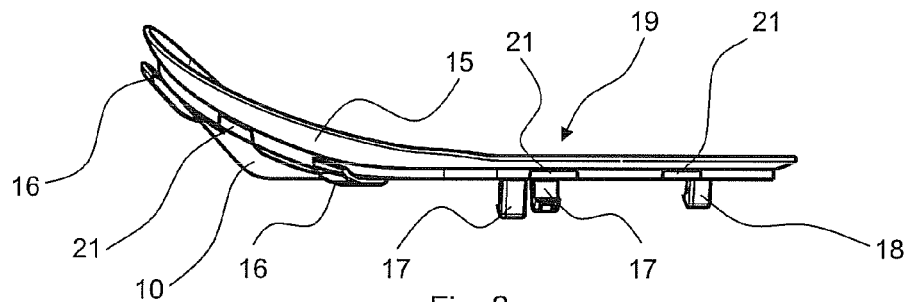
FIG. 8 shows the mirror base cap from FIG. 7 in a first side view.
Figure 9:
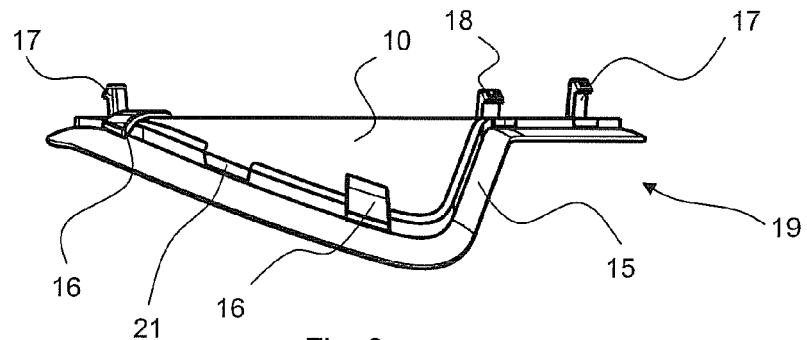
FIG. 9 shows the mirror base cap from FIG. 7 in a second side view.

It is important to emphasize here that the surface spanned by the circumferentially closed edge 09 of the opening 03, as well as the surface spanned by the contour of the mirror base cap 10 do not have to correspond to a plane, as can be seen in FIGS. 7, 8 and 9.

Alternatively or additionally, the mirror base cap 10 can comprise two latches 17, for example, which engage behind the circumferentially closed edge 09 of the opening 03, seen from a top view of the surface spanned by the circumferentially closed edge 09 of the opening 03.

In addition, the mirror base cap 10 can comprise at least one latch 18, which is assigned to the receiving pocket 11 for the protrusion 12 arranged on the mirror base 02. This assignment intends, for example, that the latch 18 comprises an extension which reaches far into the opening 03, in a direction parallel to the hinge axis 07 in such a way that seen from the surface formed by the circumferentially closed edge 09 of the opening 03, it reaches up to behind the receiving pocket 11, in order to engage behind this.

The latches 17, 18 are preferably arranged in a region of the mirror base cap 10, which lies opposite at least one connecting link 16 protruding outwards in a radial manner on the mirror base cap 10.

The term latch is used here to represent a locking means of a locking connection. A locking connection, also denoted as a clip connection or as snap connections, includes corresponding locking elements, of which at least one is elastically deformable, and hooks detachably or inextricably with at least another in connection with a deformation in production of the locking connection. Examples of corresponding locking elements of this type are an elastically malleable locking means and a rearward engagement. For example, the locking means can be designed in the form of a leaf-shaped, rigid spring with an extension arranged on this transversely to the longitudinal extension of the spring, and normal to a plane formed by the spring. The extension is formed in such a way that it is in the position to engage behind an edge or a protrusion, or to lock into a rearward engagement or a locking feature. By means of the rigid spring, it is possible for the extension, during the connection normal to the plane formed by the spring, to go round the corresponding locking element formed, for example, by the circumferentially closed edge 09 of the opening 03 in order to subsequently, once it has passed said locking element, lock therebehind by springing back with simultaneous engagement therebehind.

The invention is particularly commercially applicable in the production of exterior rear view minors and exterior rear view mirror assemblies for motor vehicles.

The invention has been described in an illustrative manner. It is to be understood that the terminology, which has been used, is intended to be in the nature of words of description rather than of limitation.

Many modifications and variations of the invention are possible in light of the above teachings. Therefore, within the scope of the appended claims, the invention may be practiced other than as specifically described.

LIST OF REFERENCE CHARACTERS

01 Mirror base cover
02 Mirror base
03 Opening
04 Part on the mirror base side of an articulated connection
05 Bearing
06 Shaft
07 Hinge axis
08 Pin
09 Edge
10 Mirror base cap
11 Receiving pocket
12 Protrusion
13 Recess
14 Central opening
15 Seal
16 Connecting link
17 Latch
18 Latch
19 Mirror base cap assembly
20 Gap or gap section
21 Extension

We claim:

1. An exterior rear view mirror assembly of a motor vehicle, the exterior rear view mirror assembly comprising:
a base bracket secured to the motor vehicle;
a mirror base fixedly secured to the base bracket, the mirror base defining a mirror base side;
a mirror base cover covering the mirror base, the mirror base cover including an opening defining a circumferentially closed edge, the opening receiving a part extending out from the mirror base side of the articulated connection of the base bracket, the part defining a periphery, wherein the circumferentially closed edge of the opening is larger than the periphery of the part on the mirror base side of the articulated connection, and a remaining section of the opening between the circumferentially closed edge of the opening and the part on the mirror base side of the articulated connection is closed by a mirror base cap assembly, which consists of a mirror base cap covering the remaining section of the opening, and a seal molded thereon, which overlaps a remaining gap between the mirror base cap and the edge of the opening,
wherein
the mirror base cap extends at least partly to the edge of the opening, so that contact between the mirror base cap and the circumferentially closed edge of the opening is made.

2. An exterior rear view mirror assembly according to claim 1, wherein the mirror base cap included a periphery having extensions arranged, which in a case of the mirror base cap assembly installed in the opening, to lie in a surface spanned by the circumferentially closed edge of the opening, and reach to the edge of the opening.

3. An exterior rear view mirror assembly according to claim 1, characterized in that, the seal is moulded to the mirror base cap in a two-part or multi-part injection moulding process.

4. An exterior rear view mirror assembly according to claim 1, wherein the mirror base cap includes a connecting link protruding outwards in a radial manner, which engages behind the circumferentially closed edge of the opening, seen from a top view of a surface spanned by the circumferentially closed edge of the opening.

5. An exterior rear view mirror assembly according to claim 4, wherein the mirror base cap includes a latch, which engages behind the circumferentially closed edge of the opening, seen from top view of the surface spanned by the circumferentially closed edge of the opening.

6. An exterior rear view mirror assembly according to claim 5, wherein the latch is arranged in a region of the mirror base cap which lies opposite the connecting link, protruding outwards in a radial manner on the mirror base cap, which engages behind the circumferentially closed edge of the opening, seen from a top view of the surface spanned by the edge of the opening.

7. An exterior rear view mirror assembly according to claim 5, wherein the latch arranged on the mirror base cap , assigned to a receiving pocket.

8. An exterior rear view mirror assembly according to claim 1, wherein the mirror base cover includes a receiving pocket in a region of the opening for a protrusion, arranged on the section of the mirror base bearing the part on the mirror base side of the articulated connection.

9. An exterior rear view mirror assembly according to claim 8, wherein the protrusion and the receiving pocket are self-centering.

10. An exterior rear view mirror assembly according to claim 1, including a surrounding seal disposed between the part on the mirror base side of the articulated connection and the mirror base cap.

* * * * *